Dec. 16, 1969   J. A. BAICKER ET AL   3,483,709
LOW TEMPERATURE SYSTEM
Filed July 21, 1967   6 Sheets-Sheet 1
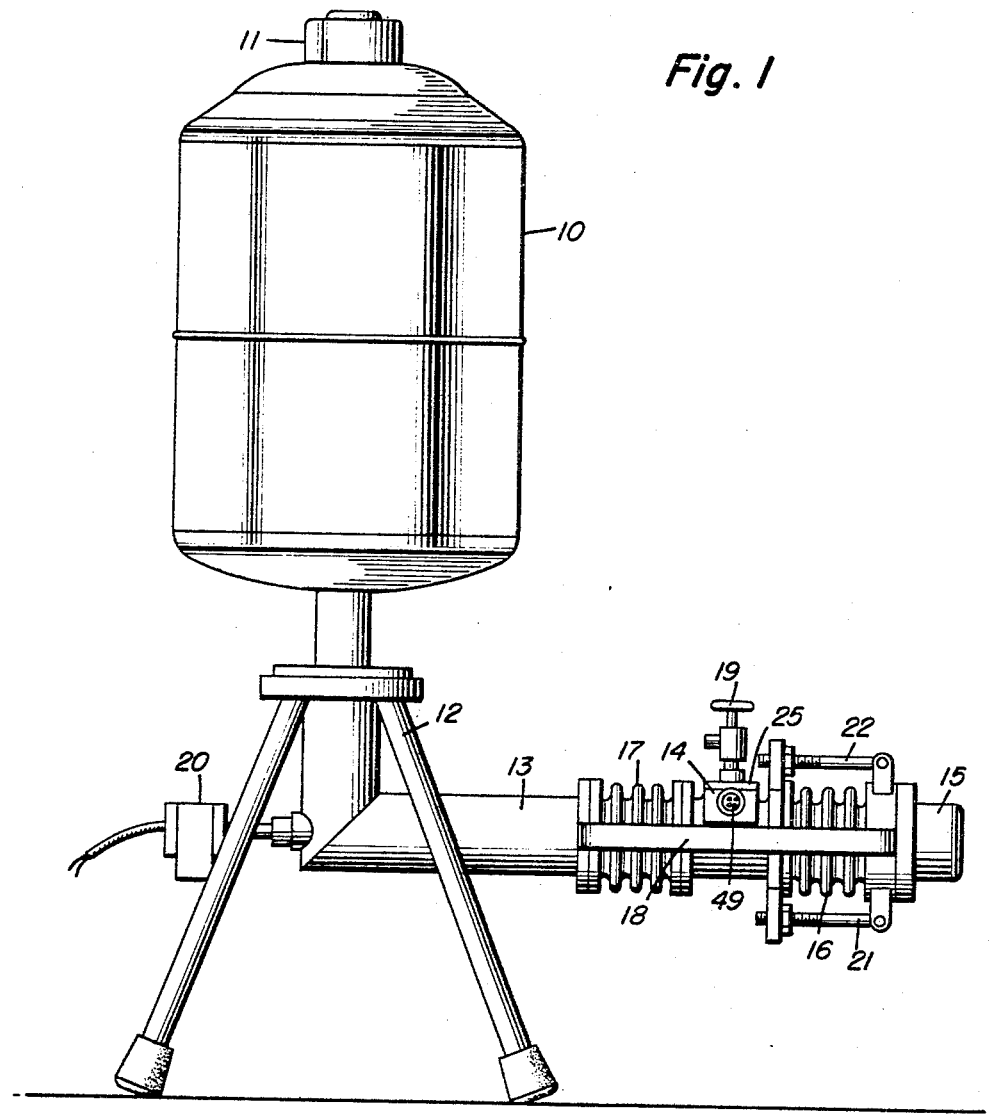
Fig. 1
Fig. 1a
INVENTORS
Joseph A. Baicker
Alden R. Sayres
BY 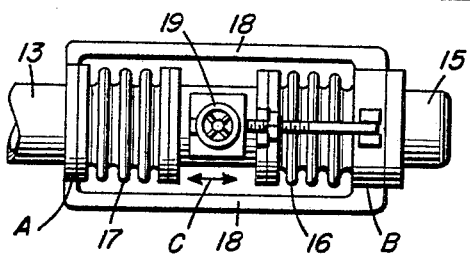
ATTORNEYS

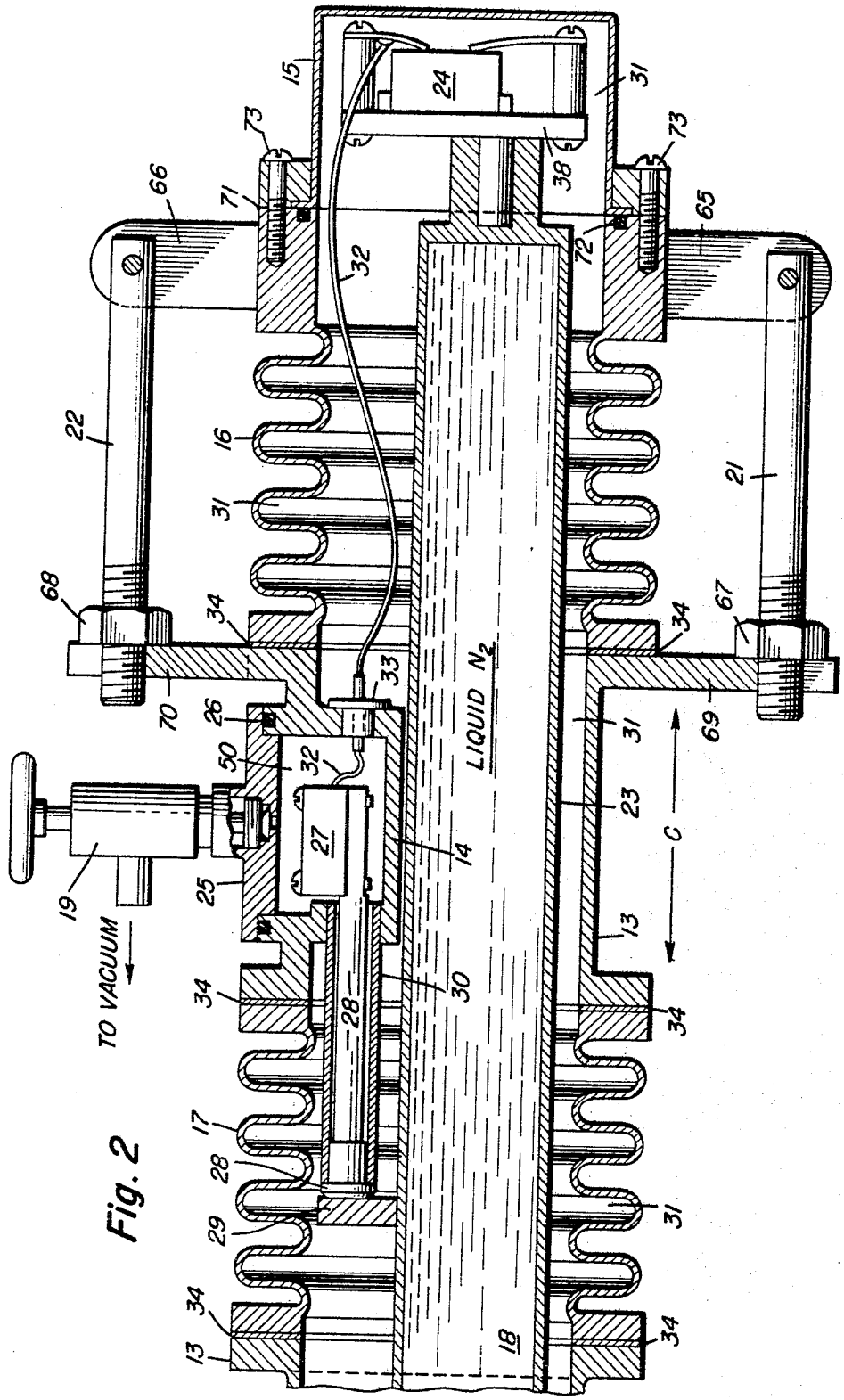

INVENTORS
Joseph A. Baicker
Alden R. Sayres

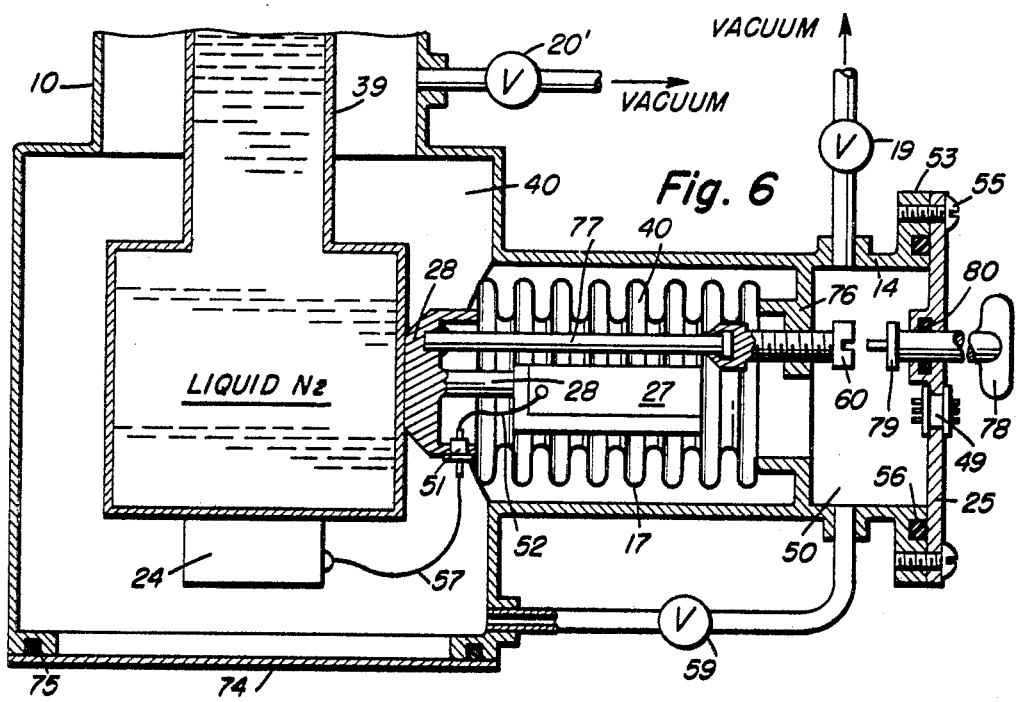
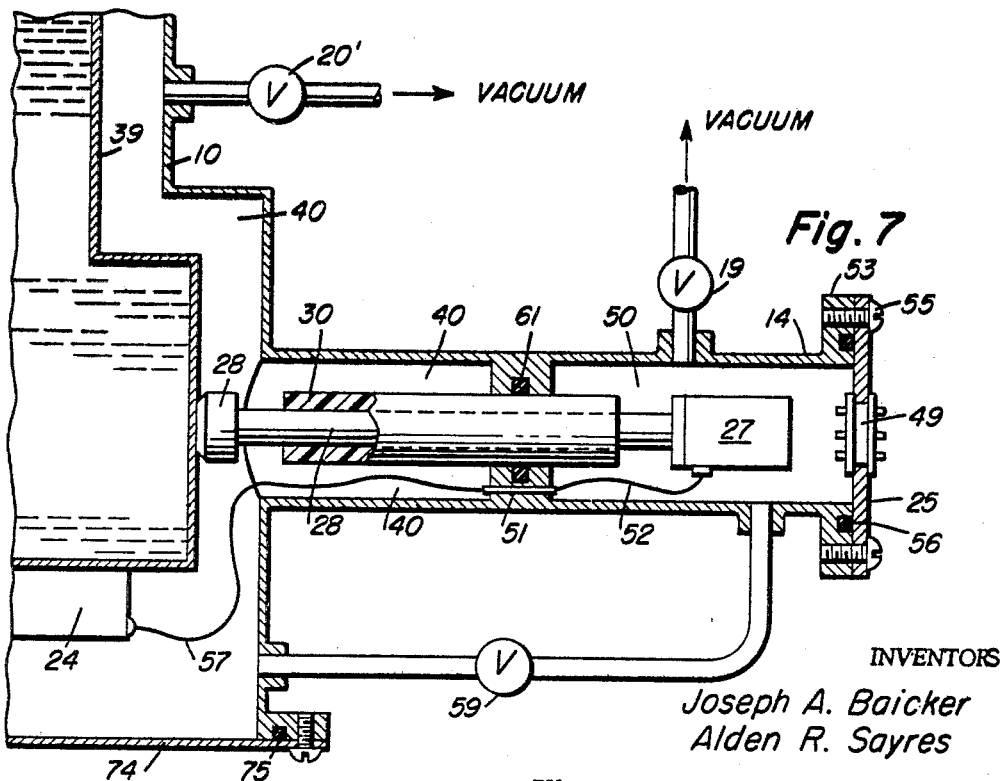
INVENTORS
Joseph A. Baicker
Alden R. Sayres
BY *Stevens, Davis, Miller & Mosher*
ATTORNEYS

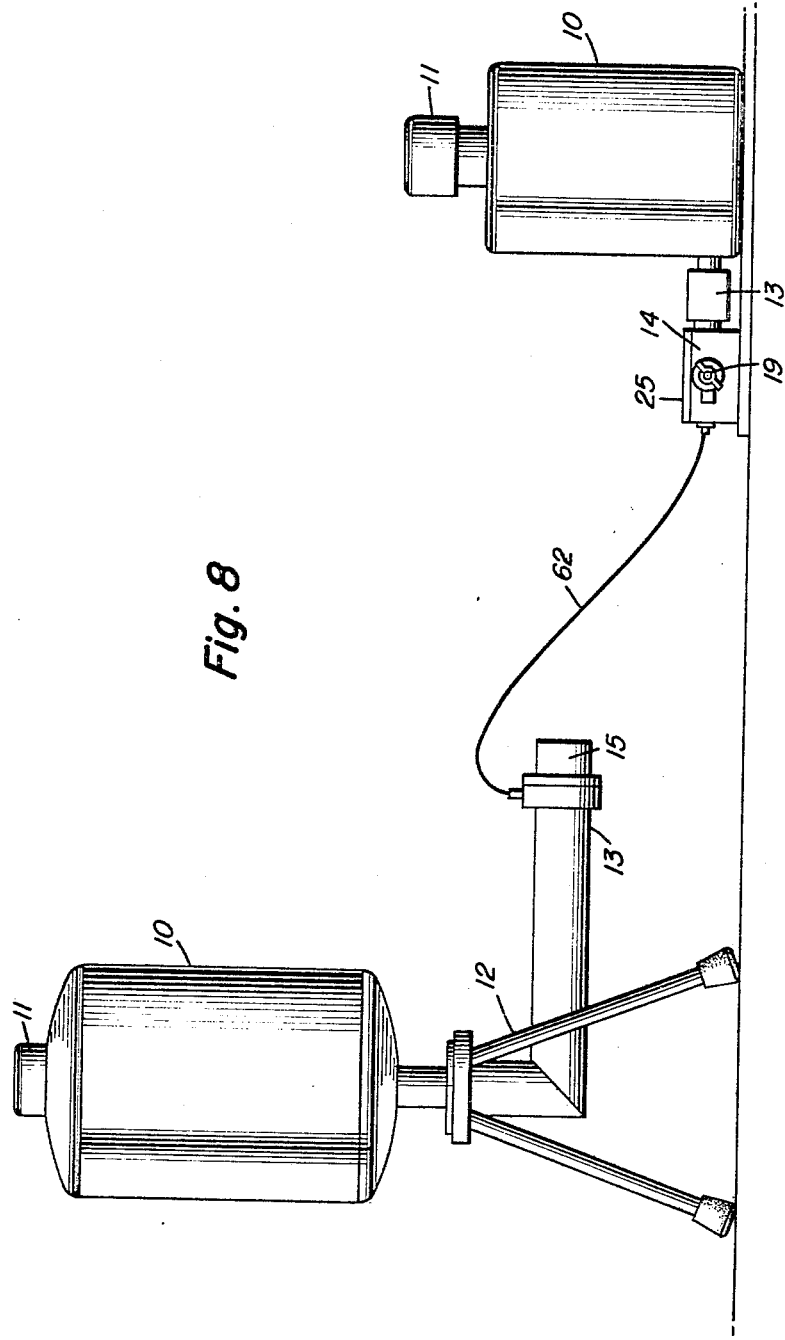

United States Patent Office

3,483,709
Patented Dec. 16, 1969

1

3,483,709
LOW TEMPERATURE SYSTEM
Joseph A. Baicker, Princeton, and Alden R. Sayres, Jersey City, N.J., assignors to Princeton Gamma-Tech, Inc., Newark, N.J., a corporation of New Jersey
Filed July 21, 1967, Ser. No. 655,092
Int. Cl. F17c 3/02
U.S. Cl. 62—45                                              25 Claims

ABSTRACT OF THE DISCLOSURE

A cold exchange system having a cold exchange reservoir, a cold sensitive device and means for making-and-breaking a cold exchange relationship between the cold exchange reservoir and the cold sensitive device. Preferably, the cold exchange reservoir is a cryogenic liquid reservoir and the cold sensitive device is a preamplifier. Also, the above system further having a second cold sensitive device, preferably a radiation detector, already in cold exchange relationship with the same cold exchange reservoir; the above system in combination with a second distinct cold exchange system comprising the hereinbefore mentioned second cold sensitive device in cold exchange relationship with its own cold exchange reservoir; and the above system in modular form, i.e., apart from the cold exchange reservoir.

BACKGROUND OF THE INVENTION

Field of the invention

The present invention relates generally to cold exchange systems, and, more particularly, it relates to cryogenic systems employing cryogenic liquids for cooling certain solid state electronic apparatus, such as radiation detectors, to very low temperatures.

Description of the prior art

Certain gamma ray detection devices known in the art make use of diodes comprised of, for example, germanium crystals. These semiconductor devices afford unusually high gamma ray energy resolution, and are becoming increasingly widely used in nuclear physics research laboratories. The aforesaid devices, unfortunately, are very perishable, and must be stored and used at low temperatures. Such devices are generally maintained at the temperature of liquid nitrogen by means of a low temperature vacuum-insulated container commonly designated a cryostat.

Recently, the nuclear electronics industry developed a novel type of preamplifier for use in conjunction with a semi-conductor nuclear detectors, such as the above. This novel type preamplifier uses field-effect transistors (FET) for the first stage of electronic amplification, rather than either vacuum tubes or ordinary transistors. The FET preamplifier exhibits considerably lower noise characteristics than the best preamplifiers hitherto known in the art.

One of the characteristics of the FET preamplifier, however, is that its noise performance can be even further improved, if the first stage of the preamplifier is cooled to a temperature somewhere intermediate between room temperature and liquid nitrogen temperature. This cooling has been effected by some workers in the field either by using an individual cryostate for the preamplifier or by using the same cryostate as is employed to cool the, e.g., germanium detector.

The use of the same cryostate as is used to cool the detector presents a serious problem, however, viz., the FET's are prone to failure, requiring occasional or even frequent replacement. Thus, if the FET's are mounted in the same cryostate with the germanium detector, one must necessarily warm up to the germanium crystal in order to effect replacement of the FET. Further, the germanium crystal is exposed to atmospheric pressure, and there is a great risk of damage to the germanium crystal during the operation. For these reasons, many workers prefer to utilize a completely separate cryostat for cooling the preamplifier.

SUMMARY OF THE INVENTION

Accordingly, an object of the present invention is that of providing an improved cold exchange system.

Another object of the present invention is that of providing an improved cryogenic system employing cryogenic liquids for cooling components of certain solid state electronic apparatus, such as radiation detectors, to very low temperatures.

A still further object of the present invention is that of providing an improved cryogenic system particularly adapted for semiconductor gamma ray detectors employing preamplifiers in conjunction therewith, which preamplifiers use field-effect transistors for the first stage of electronic amplification.

Yet another object is that of providing an improved cryogenic system adapted for germanium gamma ray detectors employing preamplifiers for enhanced noise performance in conjunction therewith, which preamplifiers use field-effect transistors for the first stage of electronic amplification, and further wherein such field-effect transistors can be readily removed or replaced without risk of damaging or destroying the germanium crystal of the detector, per se.

A further object is that of providing a cryogenic system of the immediately above type which utilizes a single cryostat for cooling both the germanium detector and the preamplifier, thus obviating the need for a completely separate cryostat for cooling the preamplifier.

Another object is that of providing a module which can be used in conjunction with existing detector-cryostat systems for their improved performance.

Briefly summarized, the system of the present invention features the technique of making cold exchange contact between two enclosures or chambers without opening each to the other or to an external environment. More specifically, one enclosure, usually under vacuum, contains a cold surface and a second, also usually under vacuum, the first stage of a preamplifier utilizing field-effect transistors for the first stage of electronic amplification, the components of which second enclosure are to be brought into cold exchange contact with the cold surface of the first enclosure for their enhanced performance.

The aforesaid bringing into contact of the components of the second enclosure with the cold surface of the first is effected via the provision of means which permits one or more of said second enclosures, particularly hermetically sealed second enclosures under vacuum, to reciprocate in make-and-break cold exchange relationship, as desired, with the said cold surface.

Preferably, the reciprocating motion can be imparted to the system by utilizing a flexible bellows (usually metallic, but which can be any other material suitable for establishing vacuum or hermetic seals), or by utilizing a sliding piston seal, or a diaphragm or any other equivalent means, all of which means serve to separate the second enclosure, e.g., the vacuum system of the preamplifier first stage, from the first enclosure, e.g., the vacuum system of a cryostat or the vacuum system of a cryostat additionally containing the detector itself.

Thus, one is able to move the FET preamplifier stage up against the cold surface or cold reservoir of the first enclosure for cooling purposes and is likewise able to move the FET preamplifier stage away from the cold surface or low temperature reservoir for purposes of warming the FET stage for servicing or replacement. In either instance, and most importantly, the action or motion is accomplished without breaking the vacuum space housing the solid state detector.

The vacuum space housing the solid state detector, e.g., the germanium crystal, may or may not be the same vacuum space as around the cold reservoir. In general, the same cold reservoir will be used to cool both the solid state detector and the preamplifier. However, it may be desirable to have a cooled preamplifier with its own cold reservoir, as in the instance of use of such a device in connection with a previously constructed or existing detector-cryostat system, which system does not have provision for a cooled preamplifier. In this manner, existing detectors or detector systems can be used with improved performance.

The hereinbefore mentioned and other features and objects of the present invention and the manner of attaining the same will become more apparent and the invention itself will be best understood by reference to the following description of several embodiments of the invention taken in conjunction with the accompanying several figures of the drawing, which figures illustrate the best modes presently contemplated for carrying out the objects of the invention and its principles, and are not to be construed as restrictions or limitations on its scope or as in any way precluding the substitution of one non-critical equivalent element for another, and further wherein like reference numerals are used to indicate like or equivalent parts.

BRIEF DESCRIPTION OF THE DRAWINGS

FIG. 1 is a vertical elevational view of a preferred embodiment of the invention, wherein the same cold reservoir is used to cool both the solid state detector and the preamplifier;

FIG. 1a is a top elevational view of a portion of the apparatus depicted in FIG. 1;

FIG. 2 is a partial cross-sectional view axially through the horizontal cylinder of FIG. 1, which cylinder provides the housing for both the solid state detector and the preamplifier;

FIG. 6 is a cross-sectional view through still another embodiment of the invention;

FIG. 7 is a cross-sectional view through still another embodiment of the invention; and FIG. 8 is a vertical elevational view of still another embodiment of the invention, wherein the solid state detector has its own cold reservoir and the preamplifier first stage likewise has its own cold reservoir.

DESCRIPTION OF THE PREFERRED EMBODIMENTS

Figure 3:
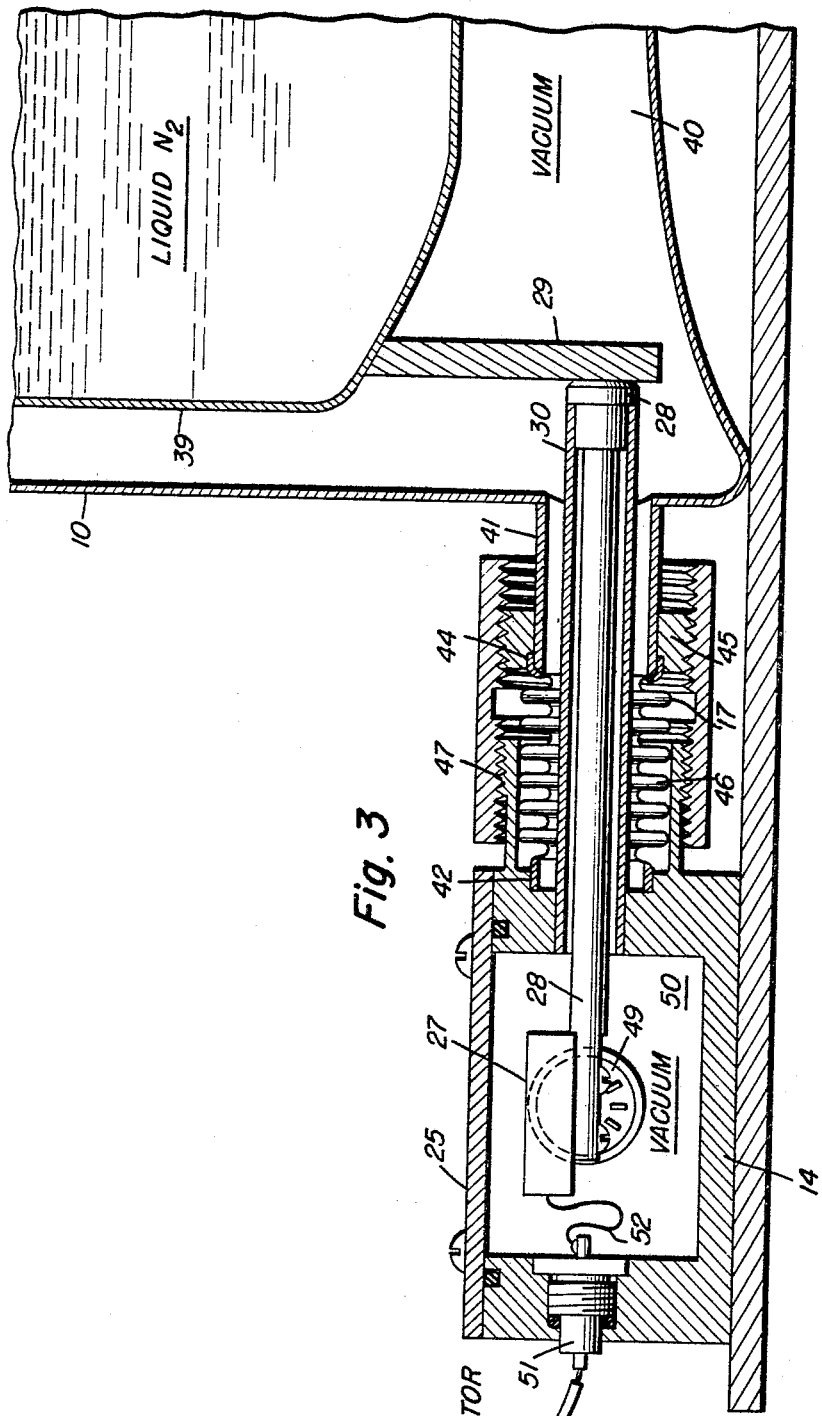
FIG. 3 is a cross-sectional view through another embodiment of the invention.

Referring now particularly to FIG. 1, the cold reservoir of the invention, generally identified as 10, comprises a conventional Dewar flask consisting of a cryogenic liquid (preferably liquid nitrogen) storage chamber enclosed by an envelope spaced therefrom with the space therebetween being evacuated or under vacuum, for example, Union Carbide's type #CR. A fragmentary cross-sectional view of such a Dewar is depicted in FIGS. 3 and 5 through 7, infra.

The liquid nitrogen chamber of the Dewar can either remain open to the atmosphere via its filling tube or inlet or the filling tube can be provided with a porous plug 11 thus permitting in either instance the evolved nitrogen gas to escape. The Dewar is further provided with a support tripod 12 and a cold path within cylindrical L-shaped conduit 13, which conduit 13 leads to and houses the preamplifier (first stage) vacuum enclosure 14 provided with cover plate 25 and the solid state detector vacuum enclosure 15. A pair of bellows 16 and 17 are spaced on either side of the said preamplifier vacuum enclosure 14, with 49 denoting means for establishing electrical contact between the first stage of the preamplifier and the main portion of the preamplifier (not shown). Such an arrangement permits a left-right motion of the preamplifier (first stage) vacuum enclosure 14 relative to the remainder of the overall system. 19 denotes an evacuation valve for the preamplifier (first stage) vacuum enclosure 14, which valve leads to a vacuum pump (not shown). 20 represents a VacIon vacuum pump (Varian Associates, Inc.) for maintaining a vacuum in both the cold reservoir vacuum space and the solid state detector vacuum space, with the controls for this pump not being illustrated. Retaining hardware 21 and 22 (illustrated only with respect to one of the bellows) is provided for controlling the left-right motion of the preamplifier (first stage) vacuum enclosure 14.

Fixed rod(s) 18 and the functions ascribable thereto are reflected upon in the explanation relative to FIG. 1a, infra.

The cooperation of the various elements within the said L-shaped conduit 13, as well as their relationship to the overall system, will likewise be hereinafter more fully described, in this instance in connection with FIG. 2.

FIG. 1a, as hereinbefore mentioned, illustrates a top elevation of a portion of the apparatus depicted in FIG. 1, more particularly, it illustrates a top elevation of the portion of the apparatus of FIG. 1 downstream (relative to the Dewar) of the juncture of the first bellows 17 with the cylindrical conduit 13.

Fixed rods 18 rigidly secured to the apparatus at points A and B serve to maintain constant the distance between points A and B and also serve to permit motion via the pair of bellows of the stage of the apparatus designated as C relative to these same points A and B.

Of course, any arrangement whereby the distance between points A and B is maintained constant is contemplated herein, the only requirement being that such alternative arrangement additionally permit of the aforesaid relative motion of the C-stage.

Referring to said FIG. 2, tubing 23 charged with liquid nitrogen and disposed within conduit 13 thermally connects the solid state radiation detector 24 with the liquid nitrogen reservoir. Alternatively, the tubing charged with liquid nitrogen could be replaced by a solid copper rod thermally communicating with the liquid nitrogen reservoir.

Detector 24 may be either a germanium or silicon crystal or any other solid state radiation detector.

The vacuum enclosure 14 of the preamplifier first stage is provided with a removable cover plate or opening 25 which presses against a neoprene O-ring 26 or gasket and which is held in place either by atmospheric pressure after a vacuum has been established therein by means of valve 19 or preferably by force of retaining screws or bolts. The cover plate or opening 25 of course permits of the installation of the actual FET preamplifier first stage 27 or of its repair.

A thermally conducting rod 28, which rod is fixed with respect to the vacuum enclosure of the FET preamplifier first stage, is provided to thermally connect the FET preamplifier first stage components 27, to which it is thermally appended, to a cold surface 29 at liquid nitrogen temperatures. The cold surface 29 is preferably a copper plate rigidly affixed to and in heat exchange relation with the said tubing 23 charged with liquid nitrogen.

The thermally conducting rod 28 extends through a long thermal path 30, for example, a stainless steel tube, to provide a poor conduction path from the thermally conducting rod 28 which is at a cold temperature to the vacuum jacket or preamplifier vacuum enclosure 14 at room temperature.

Thus, this thermally conducting rod 28 may be brought into contact with or separated from the cold surface 29 by the shortening or extending of the bellows 16 and 17, without breaking the vacuum space of either the cold reservoir, the detector 24 or the vacuum space 50 of the preamplifier first stage components 27. In the instant preferred embodiment, the vacuum spaces of the detector 24 and the cold reservoir are of course one and the same and such is designated herein as 31.

Any appropriate sleeves, bushings, flanges, rods with bolts, screws, threaded surface or equivalent means can be used to make or break the thermal contact and determine the pressure of the contact, as desired; in other words, any means through which one can positively bias the thermally conducting rod 28 and the vacuum enclosure 14 containing the FET preamplifier first stage 27 to which rod 28 is thermally affixed toward the cold surface 29 is contemplated and operable herein. The immediately aforesaid means generically can be designated as retaining hardware for controlling the left-to-right or in-and-out motion of the C-stage. Again, fixed rods 18 (which are indicated by dashed lines in the present illustration) serve to maintain constant the distance between points A and B (not labelled as such in the present illustration) without in any way impairing the freedom of motion of the said C-stage and, consequently, thermally conducting rod 28.

As an illustration of means for positively mechanically biasing the conducting rod 28 against the cold surface 29, there are depicted rods 21 and 22, which rods are threaded at one of their ends and pivotably mounted at their other ends to members 65 and 66. Adjustable nuts 67 and 68 are also provided. Thus, one can adjust the system merely by slipping the nuts 67 and 68 either to the left or right of their respective fixed flanges 69 and 70 which are provided with appropriate slots permitting such movement. In this manner, the length of the bellows can be adjusted for making or breaking the cold contact (shortening or lengthening the bellows). Alternatively, mere threaded rods having cotter pins loosely securing the same at one fixed end accomplish the same purpose, said rods being fixed at each end of the bellows with one of the securing means being provided with a cooperating female member for the corresponding threaded end of such rods. Also, threaded sleeves or collars, or a simple screw driver adjustment may be used.

Reference numerals 32 represent the electrical lead from the detector 24 to the FET preamplifier first stage components 27. Hermetic seals 33 are used to make electrical connections between the preamplifier 27 and the detector 24 and bias-voltage. Such a hermetic seal is also used to bring the electrical connection from the main portion of the preamplifier (not shown) to the cooled FET portion.

Electrical contacts may also be made or broken using a bellows or equivalent means, if two separate enclosures are to be maintained, and it is desired not to break the separation of the two or open one of the same to atmospheric or another environment. These make-and-break electrical contacts are readily accomplished merely by providing a male-female electrical connection within the system that is responsive in a make-and-break sense to the lengthening or shortening of the bellows, as desired.

The evacuation valve 19 is mounted on the vacuum enclosure 14 of the preamplifier first stage 27 and is connected to any pumping sytem (not shown), as is necessary, either to evacuate the same from atmospheric pressure after the preamplifier first stage components 27 have been mounted and/or repaired, or to maintain low pressure within the said vacuum enclosure 14, or to serve as an air inlet.

Of course, the means defining the various vacuum spaces of the system necessarily define hermetically sealed vacuum spaces. Thus, the preamplifier first stage vacuum space, which is defined by the walls of vacuum enclosure 14 surmounted by cover plate 25 and, in part, thermally conducting rod 28 within long thermal path 30, is hermeticaly sealed from the external environment, as well as from both the cryostat and solid state detector vacuum space 31, long thermal path 30 being hermetically sealed through the walls of vacuum enclosure 14 either by soldering the same therein or by any other equivalent means and thermally conducting rod 28 being hermeticaly sealed in like fashion within the said long thermal path 30, e.g., by silver soldering.

Moreover, the bellows 16 and 17 are themselves integrally hermetically sealed along and with the conduit 13 leading from the cold reservoir, for example, by mean of soldered joints 34.

The means 15 defining the solid state detector vacuum space 31, which vacuum space is combined in the present preferred embodiment with the cryostat vacuum space, is likewise hermetically sealed to the second bellows 16 at joint 71 using an O-ring 72 and mechanical pressure imparted by means of simple screws 73.

Also in FIG. 2, the system is illustrated in cold connection.

The semiconductor detector 24 is shown mounted on a thermally conducting platform 38, e.g., an aluminum or copper platform, in offset relationship with respect to the distant end of thermally conducting tubing 23, which tubing is charged with liquid nitrogen, to eliminate as much as is possible the effect of Compton scattering within the said thermally conducting tubing 23 itself.

As thereinbefore mentioned, the flexible bellows 16 and 17 are usually metallic, e.g., phosphorus bronze, brass or stainless steel, but any other material suitable for the establishment of a vacuum or hermetic seals can also be utilized.

Referring now to FIG. 3, the same illustrates a module according to the present invention which can be used in conjunction with existing detector-cryostat systems for their enhanced performance.

More particularly, conventional Dewar flask 10 containing liquid nitrogen storage chamber or reservoir 39 to which is thermally affixed a cold surface 29, e.g,. a copper plate, is thus provided with a vacuum space 40. The Dewar flask 10 is also provided with, e.g., an externally extending piece of tubing 41 defining an opening for thermal communication with the cold surface 29. The piece of tubing 41 can either be integral with the Dewar 10 or a hole can merely be cut through an existing Dewar and the tubing 41 hermetically sealed thereto, either by soldering or by making use of a system of cooperating flanges and O-rings or any other means.

The module itself comprises a preamplifier vacuum space 50 defined by a vacuum space enclosure 14 and a cover plate 25 therefor. A thermally conducting rod 28 is internally thermally connected to the FET preamplifier first stage components 27 and outwardly extends through the walls of said vacuum space enclosure 14 for such distance and in such direction as to permit thermal contact with the cold surface 29. The thermally conducting rod 28 outwardly extends through a long thermal path 30, for example, a stainless steel tube, which provides a poor conduction path from the thermally conducting rod 28 which is at a cold temperature to the vacuum jacket or preamplifier vacuum enclosure 14 at room temperature.

The bellows 17 is hermetically sealed at one of its ends to the preamplifier vacuum enclosure 14 via a soldered or silver brazed joint 42, and at its other end to the tubing 41 externally extending from the Dewar flask 10 via a soldered or silver brazed joint 44 thus affording a hermetic seal around vacuum space 46.

Thus, there is established a system wherein the FET preamplifier first stage components 27 contained in vacuum enclosure 14 can be brought into thermal contact with a cold surface 29 in the vacuum space 40 of an existing cryostat 10 without opening each vacuum space to the other or to an external environment by means of shortening the bellows 17 which serves to separate the vacuum space 50 of the preamplifier from the vacuum space 40 of the cryostat 10. The cryostat vacuum space 40 of course communicates with the free space 46 between the walls of the bellows 17 and the thermal path 30 but obviously there is no communication between preamplifier vacuum space 50 and either the vacuum space 40 of the cryostat or the vacuum space 46 in communicating relationship therewith, or with the external environment. Of course, vacuum spaces 40 and 46 are the same.

There are additionally provided externally threaded retaining hardware means 47 for mechanically positively biasing the thermally conducting rod 28 against the cold surface 29. This is effected by providing a threaded collar 48 which serves to either shorten or lengthen the bellows 17 by reason of the fact that the relationship that the threads of retaining hardware 47 bears to the externally threaded sleeve member 45, disposed around and secured to tubing 41, is that of right-handed thread to left-handed thread. Thus, by merely turning said collar 48 in a clockwise or counter-clockwise relation, there is imparted either a bellows-shortening or a bellows-lengthening motion to the system. Again, it is not necessary to even provide for the collar 48 or the threaded hardware means 47 or to have the sleeve member 45 threaded at all, since the action of atmospheric pressure on the system under vacuum is itself sufficient to afford satisfactory thermal contact with the cold surface 29, i.e., the same necessarily exerts a shortening of the bellows 17 effect upon the system.

Further as regards FIG. 3, 49 represents hermetic seal means for effecting electrical connection between the preamplifier first stage components 27 and the rest of the preamplifier (not shown). A hermetically sealed electrical connection 51 provides the means through which the preamplifier first stage components 27 are electrically connected to the semiconductor detector (not shown, but itself housed in an independent cryostat) by means of lead 52 extending thereto.

As was the case with the various vacuum spaces of the apparatus illustrated in FIG. 2, those of the present illustration are likewise all hermetically sealed in like manner.

Figure 4:
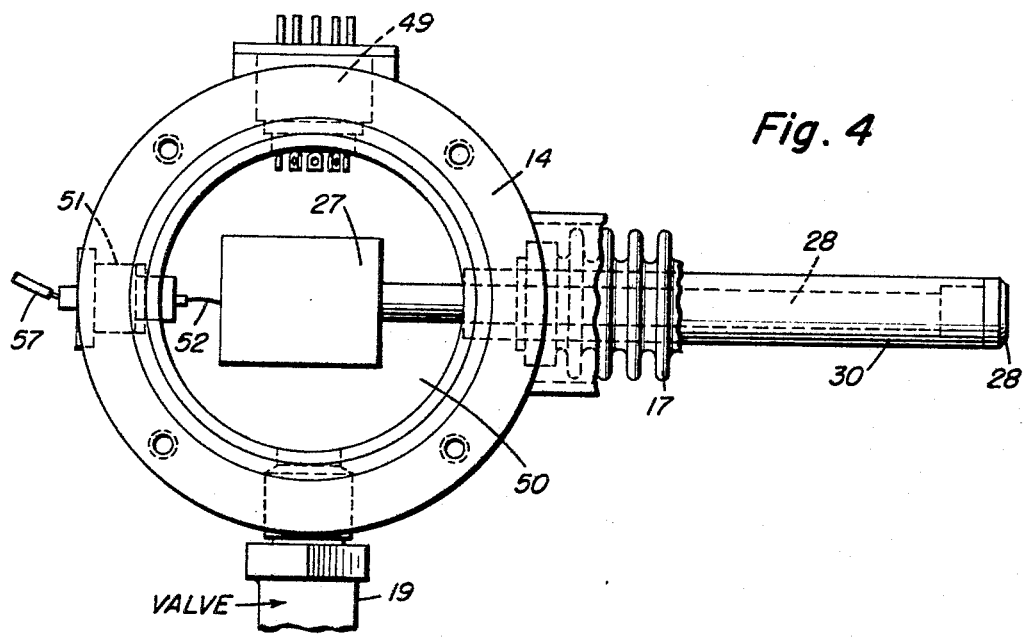
FIG. 4 is a top plan view of another embodiment of the invention, with some parts broken away to show structure.

FIG. 4 illustrates a top plan view of vacuum enclosure 14 with its cover plate removed and which is partially broken away to show structure. Thus, it is possible to observe in the vacuum space 50 the relationship existing among the FET preamplifier first stage 27, the thermally conducting rod 28 and its surrounding long thermal path 30 and the bellows 17, as well as the vacuum space 50 evacuation valve 19, the hermetically sealed electrical connection 49 for establishing electrical contact between the preamplifier first stage 27 and the rest of the preamplifier (not shown). There is also shown the hermetically sealed electrical connection 51, which affords means for electrically connecting the preamplifier first stage 27 to the semiconductor detector (not shown). Such electrical connection is easily provided merely by electrically contacting the preamplifier first stage 27 with the hermetically sealed electrical connection 51 by means of lead 52 and thence by running another lead 57 from said connection 51 to the detector (not shown), and which lead 57 should be as short as possible.

Figure 5:
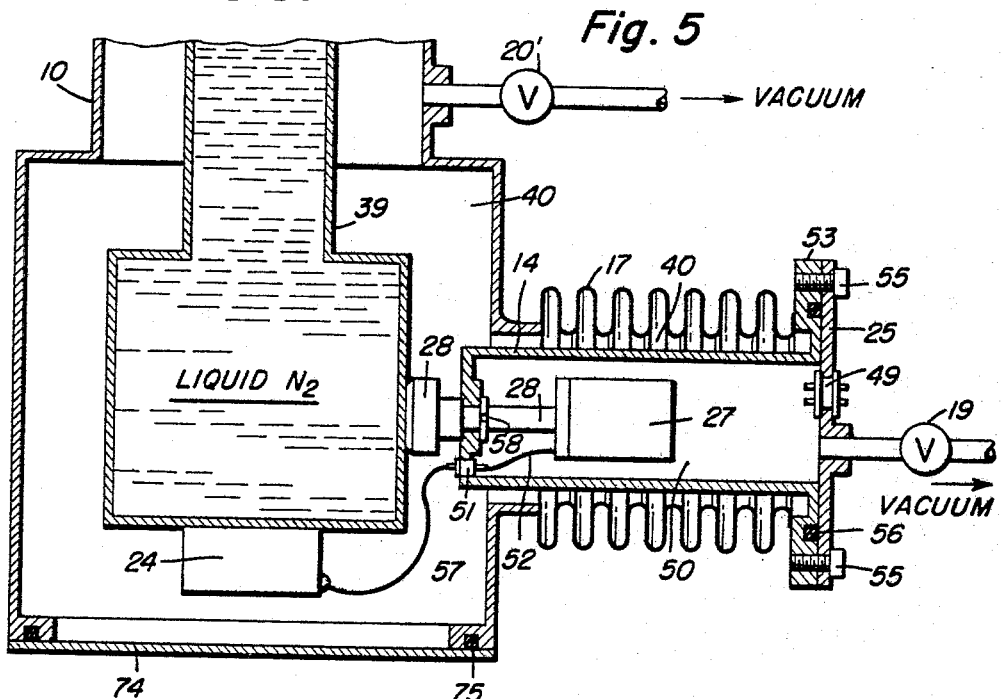
FIG. 5 is a cross-sectional view through yet another embodiment of the invention.

FIG. 5 illustrates yet another preferred embodiment of the subject contribution wherein both the detector 24 and the FET preamplifier first stage 27 are again cooled by the same cold reservoir 39, for example, a reservoir containing liquid nitrogen.

In this instance, the semiconductor detector crystal 24 is merely secured to reservoir 39 and, thus, there is afforded thermal communication or heat-exchange relationship between the liquid nitrogen and the detector 24 itself. A bottom cover plate 74 is provided to permit installation or removal of the said detector crystal 24, the same being hermetically sealed within the system when in use. O-ring 75 ensures against leakage from an external environment.

The space 40 defined by the walls of the Dewar flask 10 and the cold reservoir 39 is placed under vacuum by means of evacuation valve 20' which is mounted on the Dewar 10 and is connected to any suitable pumping system (not shown).

As is readily apparent, the detector 24 itself is also positioned within the vacuum space 40, i.e., the detector vacuum space and the cryostat vacuum space are one and the same, namely vacuum space 40.

The preamplifier first stage 27 also is positioned within its own individual vacuum space 50, which is hermetically sealed, both from the vacuum space 40 of the detector-cryostat and from its external environment. Evacuation valve 19 is connected to any suitable pumping system (not shown) to establish the vacuum.

Vacuum enclosure 14 is affixed to the overall system by being disposed within cylindrical bellows 17, which bellows 17 is either hermetically sealed at one of its ends by any appropriate means to the walls of the Dewar flask 10 or is integral therewith. The far end of bellows 17 is hermetically sealed to a flange 53 integral with or hermetically sealed to vacuum enclosure 14. There is also provided a cover plate 25 which can be removed to effect servicing or replacement of the preamplifier first stage 27. The cover plate 25 is removably hermetically sealed to vacuum enclosure 14 via securing means 55, for example, a simple screw, and a neoprene O-ring 56 is provided to ensure against leagage from the atmosphere.

By reason of the immediately above arrangement, it can be seen that the same defines a system wherein make-and-break thermal contact of thermally conducting rod 28 and, hence, preamplifier first stage 27 with cold reservoir 39 can be readily effected either by shortening or lengthening bellows 17, as desired. Such shortening or lengthening can be done either manually or by means of any appropriate retaining hardware whatsoever. In the present illustration, atmospheric pressure alone will bias thermally conducting rod 28 against cold reservoir 39. In order to break contact according to the present illustration, one need only to manually extend the bellows by pulling the same back and thence place a retaining collar or other suitable means in the system to mechanically maintain said system in the "break" position.

More particularly, the instant configuration of elements permits hermetically sealed vacuum enclosure 14 containing preamplifier first stage 27 and means for thermal communication with an external cold source, e.g., thermally conducting rod 28, to reciprocate in make-and-break thermal contact, as desired, with an external cold source, e.g., cold reservoir 39, without breaking its own vacuum space 50 and without breaking the vacuum space wherein there is disposed both the cold reservoir 39 and the semiconductor crystal 24. It is also apparent that vacuum enclosure 14 may be opened or exposed to atmospheric pressure or an external environment without affecting vacuum space 40.

Hermetically sealed electrical connection 49 provides means whereby there can be established electrical contact between internally disposed preamplifier first stage 27 and the externally disposed other stages of the preamplifier (not shown).

Hermetically sealed electrical connection 51 provides means whereby there can be established electrical contact between internally disposed preamplifier first stage 27 and externally disposed semiconductor crystal 24. As illustrated, such connection is provided by way of electrical lead 52 which runs from preamplifier first stage 27 to hermetic electrical connection 51 and thence to detector 24 by way of lead 57. Electrical contact between preamplifier first stage 27 and the other stages of said preamplifier, as aforesaid, can be effected in like manner.

The internally-externally communicating thermally conducting rod 28, with respect to vacuum enclosure 14, is hermetically sealed to vacuum enclosure 14 upon its point of extension through the walls thereof by means of hermetic seal 58.

FIG. 6 illustrates another preferred embodiment quite similar to that of FIG. 5, except that in this case the bellows 17 are not externally exposed. The bellows 17 in this instance actually comprises a part of the vacuum enclosure 14 itself, with the premamplifier first stage 27 being disposed within the said bellows 17 and hence the vacuum enclosure 14. Again, thermally conducting rod 28 provides make-and-break thermal contact with cold reservoir 39 and said thermally conducting rod 28 is thermally insulated by the bellows 17 and the walls of vacuum enclosure 14, of which the bellows 17 forms a part, by using a stainless steel bellows.

All joints and seals are again hermetic and thus all enclosures are hermetically sealed both from each other and from any external environment.

Additional embodiments of the present illustration comprise by-pass valve 59 which is mounted to connect the vacuum space 40 of both the cold reservoir 39 and the detector 24 with the vacuum space 50 of the preamplifier first stage 27. This by-pass valve 59 enables the use of the cryostat-detector pumping system (Varian Associates, Inc., VacIon pump and/or ordinary pumping via evacuation valve 20') to maintain the low pressure within the vacuum enclosure 14 of the preamplifier first stage 27, when in actual use, or also on a standby basis, after space 50 has been evacuated via evacuation valve 19.

Moreover, since the bellows 17 is not in contact with an external environment, atmospheric pressure is not available to bias thermally conducting rod 28 against cold reservoir 39, as was the case with the configuration depicted in FIG. 5. Therefore, there are provided means for positively mechanically biasing thermally conducting rod 28 against cold reservoir 39. Said means comprise herein a screw drive 60 threadedly disposed in flange 76 and so coupled to shaft 77 (which shaft 77 is soldered or otherwise affixed to thermally conducting rod 28) as to permit rotation of screw drive 60 therearound but without permitting horizontal displacement therebetween. Second screw drive 78 hermetically sealed within cover plate 25 by means of O-ring 80 is provided to afford means for controlling and operating first screw drive 60 without removing said cover plate 25. This is readily effected merely by pushing said second screw drive 78 until it engagingly contacts first screw drive 60 and thence turning the same, either clockwise or counter-clockwise, to impart the same direction of rotation to the said first screw drive 60 and thus either make or break contact between the thermally conducting rod 28 and the cold reservoir 39. When not in use, screw drive 78 is simply retracted by hand until protrusion or flange 79 comes to rest against cover plate 25. Obviously, however, any other equivalent biasing means will suffice herein.

FIG. 7 illustrates an embodiment tantamount to that of FIG. 6, with the single exception that in this instance a sliding piston seal is employed in place of a bellows to afford motion or the make-and-break thermal contact between the thermally conducting rod 28 and the cold reservoir 39. Reference numeral 61 refers to a neoprene O-ring thus providing a hermetic seal while the system is in motion or is at rest and the long thermal path 30, other than insulating the thermally conducting rod 28 from the system with the exception of preamplifier first stage 27, serves the additional purpose of preventing the O-ring 61 from freezing.

Of course, a diaphragm or other suitable means could be employed in place of either the bellows or the sliding piston seal.

Also, means for positively mechanically baising thermally conducting rod 28 against cold reservoir 39, such as was illustrated in connection with above FIG. 6, are also contemplated in connection with the present illustration, but are not shown for purposes of clarity of representation.

FIG. 8 represents another embodiment of the subject contribution wherein the solid state detector has its own cold reservoir and the preamplifier first stage likewise has its own reservoir.

Specifically, the solid state detector is disposed within vacuum enclosure 15 of a first cryostat and is permanently in thermal contact with the cold reservoir thereof. The preamplifier first stage communicates with a second cryostat, the configuration thereof being the same as that illustrated in FIG. 3. Electrical connection or lead 62 electrically connects the detector housed within vacuum enclosure 15 to the preamplifier first stage which is housed within vacuum enclosure 14. Hermetically sealed electrical connection 49 provides means by which the preamplifier first stage can be electrically connected to the remaining stages of the preamplifier (not shown).

Of course, it is desirable that lead 62 be as short as possible, or, in other words, that the preamplifier first stage be positioned as close to the detector as possible, in order to avoid loss in the energy resolution capabilities of the solid state detector system. The main portion of the preamplifier can also be mounted adjacent the first stage of the preamplifier, but in some instances space limitations may require its location some distance from the first stage. In this latter case, there is no significant disadvantage as regards loss in energy resolution capability, since the first stage is still mounted near the detector.

Other devices can be brought into contact with cold temperatures or with hot temperatures, as the case may be, using these same general techniques. If other temperature regions were found to be desirable, there are mentioned Dry Ice, liquid hydrogen and liquid helium, as alternatives to the liquid nitrogen.

As many apparently different embodiments of this invention may be made without departing from the spirit and scope thereof, it is to be understood that the same is not to be limited to the specific embodiments thereof, except as claimed in the appended claims.

We claim:

1. A cold exchange system comprising a fixed cold exchange reservoir; a cold sensitive device functionally responsive to temperature change movable relative to said reservoir; and means for reciprocating said cold sensitive device in make-and-break cold exchange contact relationship with said cold exchange reservoir, said cold exchange being by conduction.

2. The cold exchange system as defined by claim 1, wherein the cold exchange reservoir is a cryogenic liquid reservoir.

3. The cold exchange system as defined by claim 2, wherein the cold sensitive device is fixedly disposed within an evacuable enclosure.

4. The cold exchange system as defined by claim 3, wherein the means for reciprocating said cold sensitive device in make-and-break cold exchange relationship with said cryogenic liquid reservoir comprise an elongated rod of high cold-conductive material fixedly appended to said cold sensitive device and in thermal communication therewith, the said elongated rod hermetically outwardly extending through the walls defining the evacuable enclosure, and means for reciprocating said thermally conducting rod in make-and-break cold exchange relationship with the cryogenic liquid reservoir at a point without the said evacuable enclosure, whereby when in thermal contact cold is conducted from the cryogenic liquid reservoir through the thermally conducting elongated rod to the cold sensitive device.

5. The cold exchange system as defined by claim 4, wherein the thermally conducting elongated rod is thermally insulated from the elements of the system other than the cold sensitive device and the cryogenic liquid reservoir.

6. The cold exchange system as defined by claim 5, wherein the make-and-break cold exchange relationship occurs in a vacuum space.

7. The cold exchange system as defined by claim 6, wherein the reciprocating means comprises a bellows.

8. The cold exchange system as defined by claim 6, wherein the reciprocating means comprises a sliding piston seal.

9. A cold exchange system comprising a Dewar flask having an inner container defining a cryogenic liquid reservoir and an outer envelope spaced from said container, said inner container having an inlet neck portion joined to said envelope; an evacuable enclosure disposed without said Dewar flask containing a cold sensitive device fixedly disposed therein; a bellows hermetically sealed at one of its ends to the outer envelope of the said Dewar but internally communicating with the space defined by the said inner container and the said envelope of the Dewar and hermetically sealed at its other end to the said evacuable enclosure but not in internal communicating relationship therewith; with the space defined by the inner container and the envelope of the said Dewar, which space is continuous with that defined by the inner walls of the bellows, being evacuated; an elongated rod of high cold-conductive material fixedly appended to the said cold sensitive device and in thermal communication therewith within the said evacuable enclosure and hermetically outwardly extending through the walls defining the said evacuable enclosure, thermally insulated therefrom, and into the vacuum space defined by the inner walls of the bellows and the inner container and envelope of the Dewar in such direction and for such distance as to afford make-and-break thermal contact between the same and the cryogenic liquid reservoir upon shortening and lengthening the said bellows, whereby when in thermal contact cold can be conducted from the cryogenic liquid reservoir through the elongated thermally conducting rod to the cold sensitive device.

10. The cold exchange system as defined by claim 9, wherein the cryogenic liquid reservoir is a liquid nitrogen reservoir and further wherein the cold sensitive device is a field-effect transistor preamplifier for the first stage of electronic amplification.

11. The cold exchange system as defined by claim 10, further provided with means for electrically connecting the field-effect transistor for the first stage of electronic amplification to a semi-conductor radiation detector.

12. The cold exchange system as defined by claim 1, further comprising a second cold sensitive device in fixed cold exchange relationship with the said cold exchange reservoir.

13. The cold exchange system as defined by claim 4, further comprising a second cold sensitive device in fixed cold exchange relationship with the said cryogenic liquid reservoir.

14. The cold exchange system as defined by claim 6, further comprising a second cold sensitive device in fixed cold exchange relationship with the said cryogenic liquid reservoir, said second cold sensitive device also being disposed in the said vacuum space wherein the make-and-break cold exchange relationship between the thermally conducting rod and the cryogenic liquid reservoir occurs and the said second fixed cold sensitive device being thermally and hermetically distinct with respect to the first movable cold sensitive device.

15. The cold exchange system as defined by claim 9, further comprising a second fixed cold sensitive device in cold exchange relationship with the said cryogenic liquid reservoir, the said second cold sensitive device being disposed in the Dewar vacuum space and the said second cold sensitive device being thermally and hermetically distinct with respect to the first cold sensitive device.

16. The cold exchange system as defined by claim 15, wherein the cryogenic liquid reservoir is a liquid nitrogen reservoir, wherein the first cold sensitive device is a field-effect transistor preamplifier for the first stage of electronic amplification, and further wherein the second cold sensitive device is a semiconductor radiation detector.

17. The cold exchange system as defined by claim 16, wherein the field-effect transistor preamplifier first stage and the detector are electrically connected.

18. A composite cold exchange system comprising the cold exchange system as defined by claim 4; and a second cold exchange system comprising a second cryogenic liquid reservoir and a second cold sensitive device in fixed cold exchange relationship with the said second cryogenic liquid reservoir, the respective component systems being thermally and hermetically distinct with respect to each other, and means for electrically connecting the said first with the said second cold sensitive device.

19. A composite cold exchange system comprising the cold exchange system as defined by claim 6; and a second cold exchange system comprising a second cryogenic liquid reservoir and a second cold sensitive device in fixed cold exchange relationship with the said second cryogenic liquid reservoir, the respective component systems being thermally and hermetically distinct with respect to each other, and means for electrically connecting the said first with the said second cold sensitive device.

20. A composite cold exchange system comprising the cold exchange system as defined by claim 10; and a second cold exchange system comprising a second liquid nitrogen reservoir and a semiconductor radiation detector in fixed cold exchange relationship with the said second liquid nitrogen reservoir, the respective component systems being thermally and hermetically distinct with respect to each other, and the said second liquid nitrogen reservoir and the said detector being disposed within the same vacuum space.

21. The composite cold exchange system as defined by claim 20, wherein the field-effect transistor preamplifier first stage of the first component system is electrically connected to the detector of the second component system.

22. A module comprising the elements of the cold exchange system as defined by claim 3 apart from the said cryogenic liquid reservoir, and means for hermetically affixing said module to a cryogenic liquid reservoir whereby thermal communication in make-and-break relationship is permitted between the cold sensitive device and said cryogenic liquid reservoir.

23. A module comprising the elements of the cold exchange system as defined by claim 4 apart from the said cryogenic liquid reservoir, and means for hermetically affixing said module to a cryogenic liquid reservoir whereby thermal communication in make-and-break relationship is permitted between the cold sensitive device and said cryogenic liquid reservoir.

24. A module comprising the elements of the cold exchange system as defined by claim 10 apart from the said liquid nitrogen Dewar, and means for hermetically affixing said module to a liquid nitrogen Dewar whereby thermal communication in make-and-break relationship is permitted between the preamplifier first stage and said liquid nitrogen Dewar.

25. The cold exchange system as defined by claim 15, further comprising a second bellows hermetically disposed within the system, the said evacuable enclosure being disposed between the said first and the said second bellows and the said make-and-break thermal contact being afforded upon cooperative shortening and lengthening of the bellows pair.

References Cited

UNITED STATES PATENTS

| | | | |
|---|---|---|---|
| 2,096,539 | 10/1937 | Gebauer | 62—514 |
| 3,190,081 | 6/1965 | Pytryga | 62—514 |
| 3,306,075 | 2/1967 | Cowans | 62—514 |
| 3,327,491 | 6/1967 | Andonian | 62—514 |
| 3,383,879 | 5/1968 | Tice | 62—293 |

LLOYD L. KING, Primary Examiner

U.S. Cl. X.R.

62—383, 514